United States Patent [19]

Brosi et al.

[11] Patent Number: 5,020,360

[45] Date of Patent: Jun. 4, 1991

[54] PROCESS FOR DETERMINING AND EVALUATING THE COMBUSTION PRESSURE OF AN INTERNAL COMBUSTION ENGINE

[75] Inventors: Thomas Brosi, Sulzbach/Murr; Werner Hess, Fellbach; Winfried Moser, Ludwigsburg; Hermann Schneider, Heilbronn, all of Fed. Rep. of Germany

[73] Assignee: Robert Bosch GmbH, Stuttgart, Fed. Rep. of Germany

[21] Appl. No.: 477,981

[22] PCT Filed: Oct. 26, 1988

[86] PCT No.: PCT/DE88/00657

§ 371 Date: Apr. 27, 1990

§ 102(e) Date: Apr. 27, 1990

[87] PCT Pub. No.: WO89/03983

PCT Pub. Date: May 5, 1989

[30] Foreign Application Priority Data

Oct. 28, 1987 [DE] Fed. Rep. of Germany ....... 3736430

[51] Int. Cl.$^5$ .............................................. G01M 15/00
[52] U.S. Cl. .................................................... 73/115
[58] Field of Search ............... 73/115, 117.3; 123/425, 123/435

[56] References Cited

U.S. PATENT DOCUMENTS

| | | | |
|---|---|---|---|
| 4,403,505 | 9/1983 | Hattori et al. | 73/115 X |
| 4,633,707 | 1/1987 | Haddox et al. | 73/47 |
| 4,936,137 | 6/1990 | Iwata et al. | 73/115 |

OTHER PUBLICATIONS

Yamamoto/Nissan, Patent Abstracts of Japan, vol. 9, No. 320 (P-413)[2043], Dec. 14, 1985.
Nakatomi/Toyota, Patent Abstracts of Japan, vol. 10, No. 237 (P-487)[2293], Aug. 15, 1986.

Primary Examiner—Jerry W. Myracle
Attorney, Agent, or Firm—Frishauf, Holtz, Goodman & Woodward

[57] ABSTRACT

A process for determining the combustion pressure of an internal combustion engine is proposed. Conventional processes of this type have the disadvantage that the determination methods are very costly. Furthermore, stringent requirements are made of the sensors to be used. By comparison, the process proposed here is distinguished in that the combustion pressure is calculated from the combustion chamber pressure ($p(\alpha)$) determined with simple sensors, by determining the compression pressure ($p_k(\alpha)$). These values for the compression pressure are subtracted from the combustion chamber pressure in order to calculate the combustion pressure $p^*(\alpha)$. Preferably, the course of the compression pressure is obtained by measuring the combustion chamber pressure values during the compression until top dead center in the working phase and storing them in a memory. The compression values occurring after top dead center are obtained by reflection at an axis extending through top dead center, resulting in a symmetrical curve course for the compression pressure. In this way, the combustion pressure can be calculated particularly simply.

17 Claims, 4 Drawing Sheets

PROCESS FOR DETERMINING AND EVALUATING THE COMBUSTION PRESSURE OF AN INTERNAL COMBUSTION ENGINE

BACKGROUND OF THE INVENTION

The present invention relates generally to a process for determining and evaluating the combustion pressure, and, more particularly, to a process for measuring the incremental pressure caused by combustion in such a way that the ignition angle can be accurately adjusted even if the pressure sensors are not particularly accurate. [as generically defined by the preamble to claim 1.]

Processes for determining the combustion chamber are known in which very sturdy, accurate sensors are used. Particularly if the combustion pressure is to be used for controlling and/or monitoring engine functions, the requirements for accuracy of the measured pressure values are very stringent. It is also essential that the measurement sensitivity and accuracy be constant over a wide temperature range. The known processes therefore have the disadvantage that very expensive sensors must be used, if the measure pressure values are to be usable for controlling and/or monitoring the engine.

From Patent Abstracts of Japan, Vol. 9, No. 320 (p-413) (2043), Dec. 14, 1985, JP-A 60 147 631, an apparatus for determining the combustion pressure is known. To this end, on the one hand the pressure in the combustion chamber is detected by means of a pressure sensor; on the other, the compression pressure at specific crankshaft angle positions is calculated continuously. By subtracting the compression pressure from the measured combustion chamber pressure, the combustion pressure can then be determined, which is finally used for determining the instant of ignition. This apparatus thus requires computer-aided determination of the compression pressure and makes use of variables that are not stable for long periods of time, because over the life of an internal combustion engine, sealing problems repeatedly occur at inlet and outlet valves, and moreover the piston rings are subject to wear over the life of the engine.

ADVANTAGES OF THE INVENTION

The process for determining the combustion pressure of an internal combustion engine according to the present invention has the advantage over the prior art that even simple, relatively inaccurate pressure pickups can be used, in which the measurement sensitivity varies during operation. This is attained by providing that the combustion pressure is found by determining the compression pressure prevailing in the combustion chamber of a cylinder, that is, the pressure that prevails in the combustion chamber without the influence of an ignition event. These pressure values are stored in memory and are subtracted from the combustion chamber pressure instantaneously prevailing during engine operation, to produce the instantaneous combustion pressure values. All the pressure values are determined as a function of the crankshaft angle $\alpha$. Thus the course of the combustion pressure is calculated from the difference between the instantaneous combustion chamber pressure $p(\alpha)$ and the compression pressure $p_k(\alpha)$. The combustion pressure is therefore also called the differential combustion pressure.

In a particularly preferred process, the compression pressure is measured as a function of the crankshaft angle $\alpha$ up to a predetermined crankshaft angle and stored in memory. The resultant pressure course is reflected at an axis extending through the predetermined crankshaft angle, and the values stored in memory before the predetermined crankshaft angle is attained are recalled as soon as this crankshaft angle is exceeded. This value of the compression pressure, extending along a symmetrical curve, is used to calculate the value of the combustion pressure. In other words, the compression pressure values obtained in this calculation are subtracted from the instantaneous combustion pressure in order to determine the combustion pressure value.

Preferably, this process can be used to regulate the ignition angle in an internal combustion engine. To this end, the maximum value of the combustion pressure over the crankshaft angle is determined. By shifting the ignition angle, this maximum combustion pressure value is now shifted until it arrives at a desired crankshaft angle. Accordingly, with this process, the so-called combustion position—that is, the energy conversion referred to the crankshaft position—can be regulated in such a way as to produce the most favorable possible exhaust figures and engine fuel consumption. The position of combustion, or combustion position, is characterized by the instant, or the crankshaft position, at which 50% of the energy of the cylinder charge is converted.

This process can preferably also be used in monitoring the engine based on the combustion pressure. Once again the maximum value of the combustion pressure is determined, and the cyclical fluctuations of this maximal value are used to monitor the engine. It is also possible to perform regulation of smooth engine operation using the cyclical pressure fluctuations obtained.

The process for determining the combustion pressure as defined by the characteristics of claim 15 has the advantage that the values required to determine the combustion pressure are very easily determined. The measured combustion chamber pressure is integrated with the aid of two crankshaft angle-controlled integrators in order to calculate an integral value $P^*_j$ of the combustion pressure. A first integration range extends from a predetermined crankshaft angle over a predetermined crankshaft angle range. A second integration range extends over an angular range of the same size located before the predetermined crankshaft angle. To calculate the integral value $P^*_j$, the result of the integration located before the predetermined angle is subtracted from the result of the integration located after that angle.

In a particularly preferred process, top dead center of a cylinder during the working cycle is selected as the predetermined crankshaft angle.

DRAWING

The invention will now be described in further detail referring to the drawings. Shown are:

FIG. 1, a diagram that shows the location of the pressure maximum with reference to a defined combustion position;

FIG. 2, the flow chart of a first embodiment of a process for regulating the ignition angle in an internal combustion engine;

FIG. 3, the flow chart of a second embodiment of the process of FIG. 2;

FIG. 4, a diagram that shows the combustion chamber pressure over the crankshaft angle $\alpha$ (solid line), the course of the combustion chamber pressure reflected at an axis intersecting top dead center (dotted line), and the course of the calculated combustion pressure (dashed line) at low load;

FIG. 5, the course of the combustion chamber pressure and the calculated combustion pressure over the crankshaft angle at high load;

FIG. 6, the course of the combustion chamber pressure and the calculated combustion pressure over the crankshaft angle at low load;

FIG. 7, a flow chart which shows how the maximal value and the associated crankshaft angle are determined from the combustion pressure;

FIG. 8, the flow chart in a process for determining an integral value of the combustion pressure course; and FIG. 9, the flow chart of a process for determining the combustion pressure, in which an integral value is determined directly from the combustion chamber pressure.

DETAILED DESCRIPTION OF THE EMBODIMENTS

Figure 1:
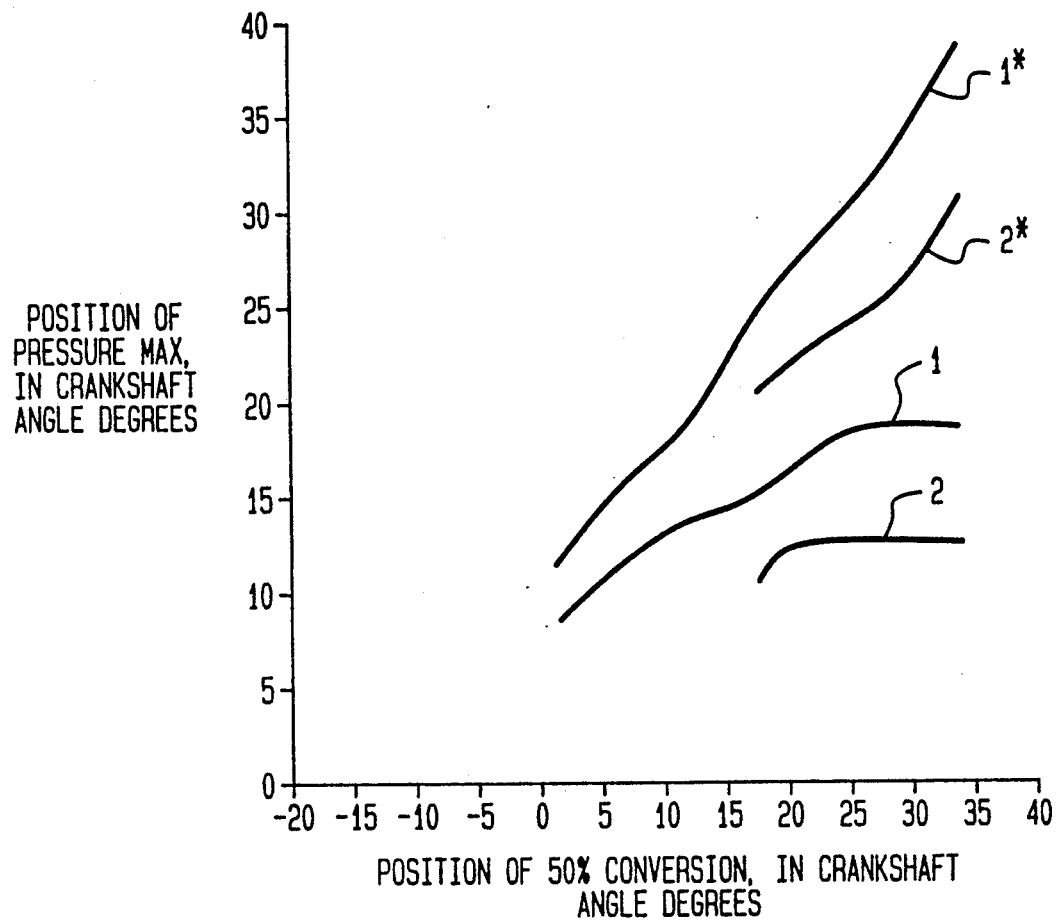

One essential parameter for controlling and monitoring an internal combustion engine is the combustion pressure prevailing in the combustion chamber.

To enable determining the combustion chamber pressure so accurately that the measured pressure values are usable for controlling and monitoring an engine, in known processes very accurate pressure pickups must be used, which have uniform measurement sensitivity over a wide range.

In the process according to the invention, the combustion chamber pressure $p(\alpha)$ is determined by means of a simple pressure sensor. The pressure values determined are not used directly to determine the combustion pressure, however.

In addition to the combustion chamber pressure $p(\alpha)$, the so-called compression pressure $p_k(\alpha)$ is measured. The term compression pressure means the pressure that is produced in a combustion chamber by the motion of the piston inside the cylinder, without ignition taking place. The engine acts as a compressor here, and therefore the compression pressure is also known as compressor pressure.

The compression pressure is measured at a predetermined crankshaft angle, here up to top dead center of the piston. These pressure values produce a curve course over the crankshaft angle $\alpha$. This curve course is reflected at a vertical axis that passes through top dead center.

This reflection can be done graphically, for instance, by plotting the course of the compression pressure $p_k(\alpha)$ over the crankshaft angle $\alpha$ up to top dead center and geometrically reflecting the curve course obtained up to that point. It is also possible to feed the pressure values occurring up to top dead center into a memory. Once top dead center is reached, the pressure values that were measured and stored in memory, the same crankshaft angle amount prior to top dead center are recalled.

The compression pressure can also be detected continuously during engine operation. Then, however, it must be assured that before top dead center no substantial pressure variations are caused by an ignition event. It is also possible to ignore such pressure variations. However, it is also conceivable to determine the compression pressure in a measurement event independently of engine operation, store it in a memory, and to perform the reflection of the curve course thus obtained.

From the measured combustion chamber pressure $P(\alpha)$ and the compression pressure $P_k(\alpha)$, the combustion pressure $P^*(\alpha)$ is calculated, by subtracting the compression pressure $P_k(\alpha)$ from the actual combustion chamber pressure $P(\alpha)$. The substitute variable generated instead of the current combustion chamber pressure, namely the combustion pressure $P^*(\alpha)$, is accordingly obtained from the following equation:

$$P^*(\alpha) = P(\alpha) - P_k(\alpha). \tag{1}$$

With the aid of this process, a pressure course is determined that is based solely on the combustion in the combustion chamber. A particularly advantageous feature is that the pressure determination can also be done with the aid of relatively inaccurate pressure pickups, the sensitivity of which varies over the course of operation.

The compression pressure $P_k(\alpha)$ prevailing in the combustion chamber can also be obtained in some other way and used to calculate the substitute pressure value. To do so, the polytropic compression or expansion is determined in accordance with the following equation:

$$p_k(\alpha) = \left[ \frac{V(\alpha 1)}{V(\alpha)} \right]^n \cdot p_k(\alpha 1). \tag{2}$$

To enable defining the course of the substitute pressure over the crankshaft angle $\alpha$, the compression pressure $P_k(\alpha 1)$ prevailing in the combustion chamber at a predetermined crankshaft angle $\alpha 1$, for instance 60° before top dead center of the associated cylinder, is ascertained. This crankshaft angle is selected such that it is certain that combustion is not as yet taking place in the combustion chamber. Furthermore, the combustion chamber volume $V(\alpha 1)$ at this crankshaft angle is ascertained. Also included in equation (2) is the compression pressure $P_k(\alpha)$ at a crankshaft angle $\alpha$, the combustion chamber volume $V(\alpha)$ at a crankshaft angle $(\alpha)$, and the polytropic exponent n, which in present-day Otto engines has an approximately value of 1.32.

Equation (2) can be further simplified by replacing the term in brackets with $c(\alpha)$. Accordingly, the following applies:

$$\left[ \frac{V(\alpha 1)}{V(\alpha)} \right]^n = c(\alpha). \tag{3}$$

The values for $c(\alpha)$ are stored in a table, in other words in a memory. For each crankshaft angle $\alpha$, the associated values of $c(\alpha)$ are called up for calculating the substitute pressure $P^*(\alpha)$.

Accordingly, from equation (1) in combination with equations (2) and (3), the following function is obtained for the substitute pressure $P^*(\alpha)$:

$$P^*(\alpha) = P(\alpha) - c(\alpha) P_k(\alpha 1). \tag{4}$$

One option for evaluating the pressure values obtained by this process will now be described in terms of a process for regulating the ignition angle in an internal combustion engine.

In a known process of this type, the combustion position, that is, the energy conversion referred to the crankshaft position, is regulated such that the exhaust figures and fuel consumption are as favorable as possible. The combustion position is defined by the instant or crankshaft position at which 50% of the energy of the cylinder charge is converted. The thus-defined combustion position is calculated from the combustion chamber pressure course. However, this calculation is very complicated. In conventional processes, the thus-defined combustion position is utilized to calculate the combustion chamber pressure course. Particularly in low load states, an unequivocal association between the position of combustion and the maximum combustion chamber pressure is practically impossible in known processes.

In a further known process of this type, the position of maximum combustion chamber pressure, that is, the crankshaft position or crankshaft angle upon occurrence of the maximum combustion chamber pressure, is determined as a substitute variable, for determining the combustion position. In a high engine load state, an unequivocal association between the position of combustion and the pressure maximum can be found. However, this is not possible in a low load state and particularly during idling. The reason is that the combustion chamber pressure variation in the range immediately following top dead center is composed of a pressure drop, caused by the increasing combustion chamber volume, and a pressure rise, based on the chemical energy liberated at that instant. The liberation of energy is effected by the combustion of the fuel-air mixture. The maximum combustion chamber pressure is then attained whenever the pressure rise and the pressure drop cancel each other out.

By varying the ignition angle, it can be attained that the pressure maximum is shifted and occurs at a different crankshaft angle. If the ignition angle or in other words the instant of ignition is varied, then the combustion position shifts. The balance between the aforementioned pressure rise and pressure drop then shifts as well. Accordingly, with the change in this position of equilibrium, the combustion chamber pressure maximum varies as well.

At low load, less chemical energy is liberated. As a result, the pressure rise after reaching top dead center is also less. The influence of the pressure drop based on the increasing combustion chamber volume is therefore relatively large. At low load, the course of the energy conversion also varies as a function of the combustion position. As a result, even with a varying ignition angle, the position of the pressure maximum virtually does not vary with the position of combustion.

If the above-described process for determining the combustion chamber pressure is used to regulate the ignition angle in an internal combustion engine, then the combustion position is simpler to calculate, and even at low engine load an unequivocal association of the combustion position and the crankshaft angle, given a varied ignition angle, can be made. The pressure maximums used to determine the combustion position can be associated unequivocally with various combustion positions via a variation in the ignition angle in all ranges, or in other words from high loads down to idling. Accordingly it is readily possible, by varying the ignition angle, to regulate the position of combustion such that it can be associated with a predetermined crankshaft angle found to be optimal.

This is attained in that first the maximal value of the calculated combustion pressure $P^*(\alpha)$ and the associated crankshaft angle $\alpha^*_{max}$ are ascertained. The ignition angle is then varied such that the maximal value of the combustion pressure occurs at a desired crankshaft angle. In that case, $\alpha^*_{max}$ then coincides with the desired crankshaft angle.

For this process of regulating the ignition angle, it is particularly advantageous if the combustion chamber pressure values determined during the compression phase, that is, the compression pressure $P_k(\alpha)$, are stored in memory and the thus determined curve is flipped over or reflected upon reaching a predetermined angle, for instance top dead center, resulting in a symmetrical curve for the compression pressure. This curve is then used to calculate the course of the compression pressure $P^*(\alpha)$ that is used for determining the combustion position. Particularly simple control is attained with this process.

Reference will now be made to FIGS. 1-6, to explain two types of embodiment of the process.

FIG. 1 shows a diagram in which the position of the maximum combustion chamber pressure is plotted over the position of combustion, or combustion position. The pressure maximum and the combustion position are plotted over the crankshaft angle $\alpha$, and by definition, at top dead center during the combustion phase, the crankshaft angle $\alpha$ assumes the value of zero.

The combustion position is also defined here as the point at which 50% of the energy of the cylinder charge is converted.

Curve 1 is assumed for high engine load, and curve 2 for a low load state of the engine. It can be seen that the association between the position of the pressure maximum and the position of combustion is unequivocal over a wide range in curve 1. This is not the case in curve 2. The two curves 1 and 2 were picked up using a conventional measurement method.

Conversely, the curves 1* and 2* are picked up by a process according to the invention. They reproduce the position of the maximum combustion pressure values obtained with the aid of the process according to the invention. It is clear that the association between the position of the pressure maximum and the position of combustion is unequivocal over a wide range, even at low engine load. The range of unequivocal association is moreover expanded for a high load state, as represented by the curve 1*. The curve 2* indicates a state of low load of the engine. The pressure values for the curves 1* and 2* are obtained by the process described above.

Instead of the current combustion chamber pressure $p(\alpha)$, which varies as a function of the crankshaft position or crankshaft angle $\alpha$, the combustion pressure $P^*(\alpha)$ is calculated. To this end, the course of the compression pressure $P_k(\alpha)$ is ascertained, namely the pressure that occurs as a function of the crankshaft angle $\alpha$ in purely compressor operation of the engine, or in other words without any influence by the ignition. The compression pressure is subtracted from the actual combustion chamber pressure, resulting in the combustion pressure $P^*(\alpha)$ of equation (1) given above.

From the course of the combustion pressure $P^*(\alpha)$, the position of the maximal value is ascertained with respect to the crankshaft angle in an arbitrary manner. The associated crankshaft angle is indicated by the symbol $\alpha^*_{max}$. The position of the maximal value of the combustion pressure obtained in this way is shown for high loads in curve 1* and for a low load state in the curve 2* in FIG. 1. The position of the maximal value of the combustion pressure is associated with the combustion position in each case.

Figure 2:
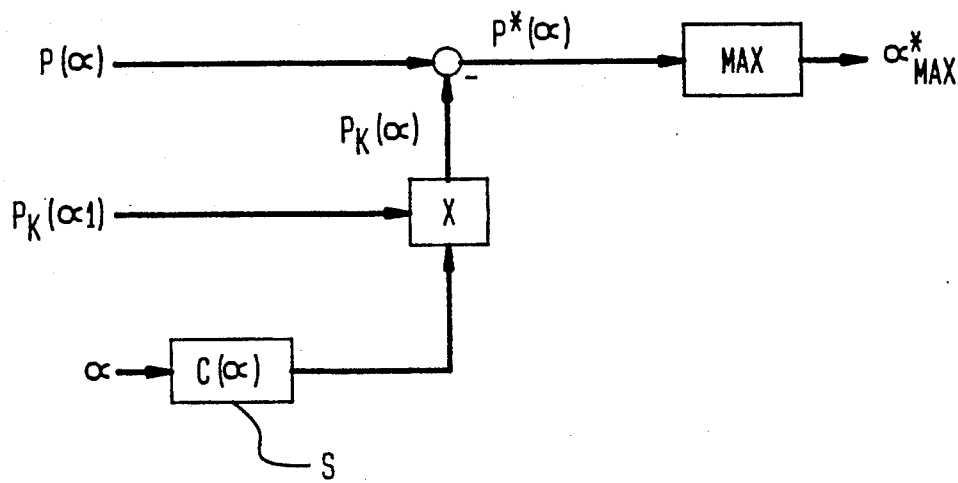

FIG. 2 shows the associated flow chart, which is explained below:

For each crankshaft $\alpha$, the associated value of the function $c(\alpha)$ given in equation (3) is called up from a table, for instance from a memory S, and multiplied by the value of the compression pressure $P_k(\alpha 1)$ measured at a given angle $\alpha_1$. The thus-obtained compression pressure $P_k(\alpha)$ is subtracted from the actual combustion chamber pressure $p(\alpha)$, to determine the combustion pressure $P^*(\alpha)$.

In a next step, the maximal value of the combustion pressure $P^*_{max}$ is determined. The associated crankshaft angle $\alpha^*_{max}$ at which the pressure maximum occurs is also determined.

A further embodiment of the process will now be explained in conjunction with FIGS. 3 and 4:

To determine the compression pressure, here indicated by the symbol $P_s(\alpha)$, the values of the combustion chamber pressure $p(\alpha)$ that are measured before attainment of a given crankshaft angle, for instance top dead center, are stored in memory along with the associated crankshaft angle. The resultant pressure course curve is "flipped over" upon reaching top dead center; that is, it is reflected at an axis that intersects the dead center position and is likewise stored in the memory. The course of the memorized compression pressure $P_s(\alpha)$ is shown in FIG. 4 in dotted lines. From this diagram it can be seen that until top dead center is attained, the combustion chamber pressure $p(\alpha)$ and the compression pressure $P_s(\alpha)$ are identical.

In this embodiment of the process as well, the compression pressure $P_s(\alpha)$ is subtracted from the actual pressure prevailing in the combustion chamber in order to determine the combustion pressure $P^*(\alpha)$, resulting in the following equation (5):

$$P^*(\alpha) = p(\alpha) - P_s(\alpha). \quad (5)$$

The values for $P_s(\alpha)$ are called up from the memory element S.

Figure 3:
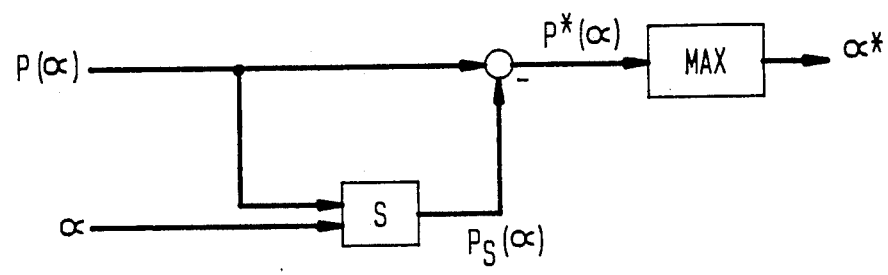

This can be seen from FIG. 3, which shows the flow chart of this process. As shown there, the values of the combustion chamber pressure $p(\alpha)$ are fed to the memory element S as a function of the crankshaft angle $\alpha$. After the predeterminable crankshaft angle is attained, in this case top dead center, the values in the form of $P_s(\alpha)$ obtained by curve reflection are called up from the memory S. To obtained the combustion pressure $P^*(\alpha)$, the difference between $p(\alpha)$ and $P_s(\alpha)$ is determined in accordance with equation (5).

Figure 4:
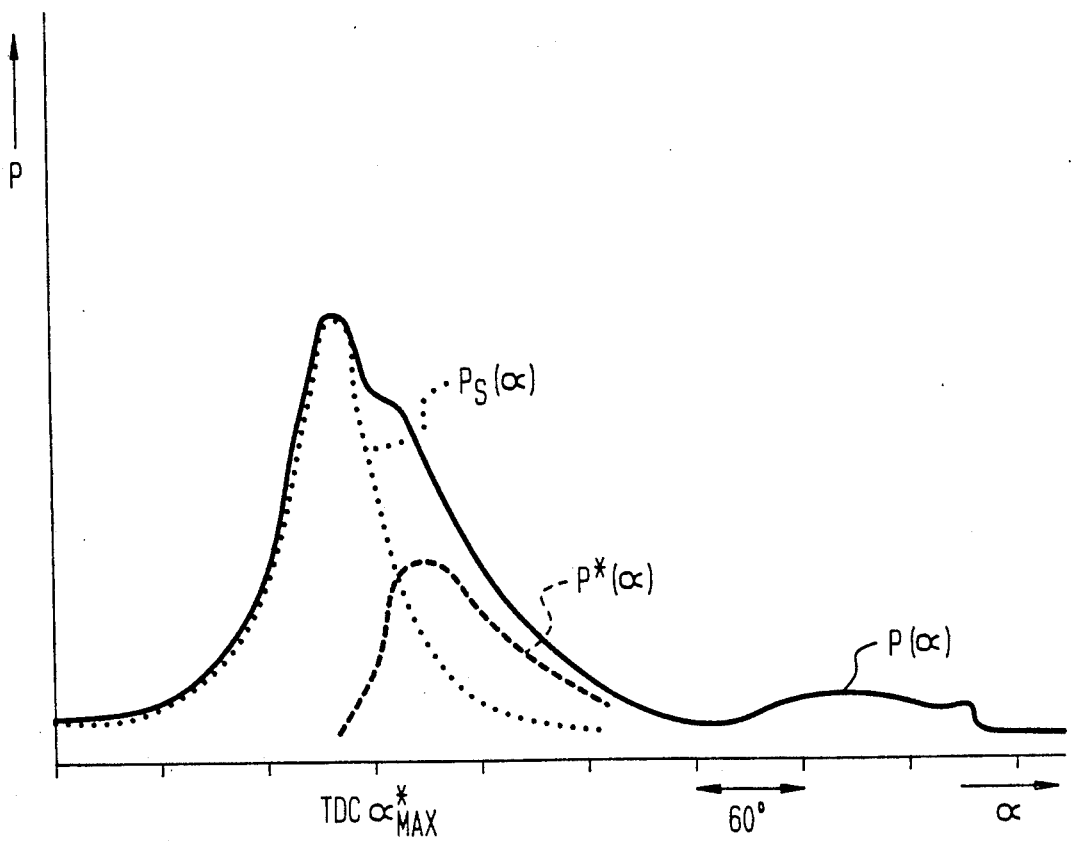

The course of the curve for the combustion pressure $P^*(\alpha)$ at low load, namely during idling, is shown in dashed lines in FIG. 4. As in the above-described embodiment of the process, the maximal value of the combustion pressure, that is, $P^*_{max}$, and the associated crankshaft angle $\alpha^*_{max}$ are ascertained here.

FIG. 4 clearly shows the advantages of this process over conventional processes. The course of the combustion chamber pressure $p(\alpha)$ illustrated by a solid line attains its maximal value at top dead center, and subsequently in the descending portion of the curve exhibits only irregularity; that is, the curve does not drop continuously. The combustion position cannot be detected from this curve by means of a maximal value analysis.

Figure 5:
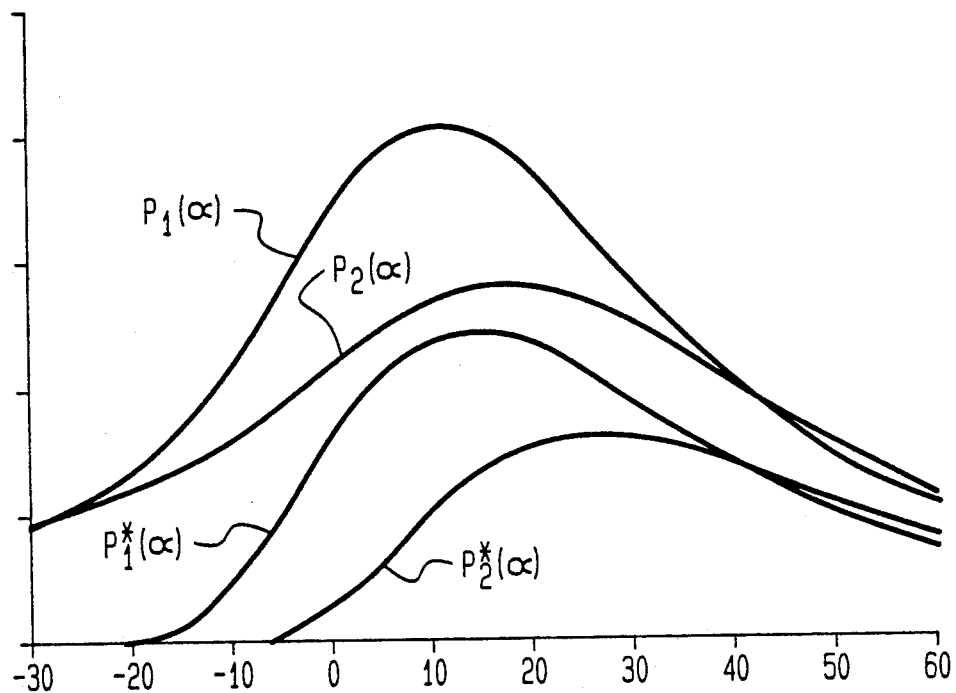
Figure 6:
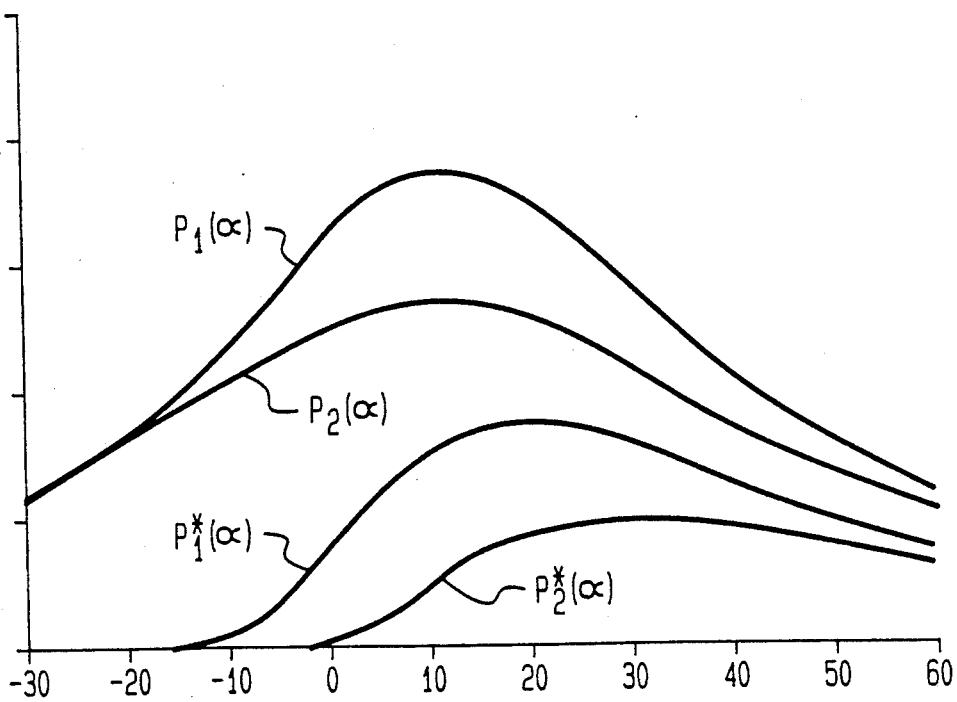

Contrarily, if the course of the combustion pressure $P^*(\alpha)$ shown in dashed lines is observed, then an unequivocal maximum can readily be ascertained From the position of the maximal value, a conclusion can readily be drawn as to the combustion position The advantages of this process can be explained in conjunction with FIGS. 5 and 6.

FIG. 5 shows the course of the combustion chamber pressure $p(\alpha)$ and of the calculated combustion pressure $P^*(\alpha)$ over the crankshaft angle $\alpha$ during a high load state. In this diagram, as in FIG. 6, a distinction is made between the pressures $p_1(\alpha)$ and $P_2(\alpha)$, or between $P^*_1(\alpha)$ and $P^*_2(\alpha)$. The deviating pressure course between $P_1$ and $P_2$, or between $P^*_1$ and $P^*_2$, is based on a variation in the ignition angle. At $P_2$ or $P^*_2$, the ignition angle is shifted toward "late" by 20° of crankshaft angle as compared with $P_1$ or $P^*_1$. The maximums of the pressure curves are indicated by vertical marks in the various curves. It is clear that if the ignition angle is varied by 20 of crankshaft angle, the shift in the maximums has less effect in the course of the combustion chamber pressure $P_1(\alpha)$ and $P_2(\alpha)$ than in the course of the combustion pressure $P^*_1(\alpha)$ and $P^*_2(\alpha)$. In other words, a regulation of the position of the combustion or of the pressure maximums with the aid of the ignition angle at a high load state, based on the process according to the invention, is more effective than in conventional processes.

The advantages of the process according to invention become even clearer in low load states of the engine.

From the curve courses shown in FIG. 6, it can be seen that the maximums of the combustion chamber pressure $P_1(\alpha)$, $P_2(\alpha)$ shift virtually not at all if the ignition angle has been shifted toward "late" by 20 of crankshaft angle in the measurement of $P_2(\alpha)$ compared to the measurement of $P_1(\alpha)$. Contrarily, the maximums of the combustion pressure courses $P^*_1(\alpha)$ and $P^*_2(\alpha)$ are clearly distinguishable. This means that in this process, the combustion position or the position of the pressure maximums can be shifted, by varying the ignition angle, in such a way and until such time as the combustion position or the pressure maximum is at the desired crankshaft angle.

It can also be noted that determining the compression pressure by using the polytropic compression or expansion requires the detection of the absolute pressure. Besides, many pressure pickups are unsuitable for static pressure measurement. Instead of the absolute pressure, the pressure prevailing in the engine intake tube during the aspiration phase is therefore detected, and the pressure pickup is set to "0" with the aid of this value at each intake operation. The stairstep pressure drop on the right in the diagram of FIG. 4 indicates the beginning of the aspiration phase.

The process of reflecting the course of the compression pressure is unsuitable if a substantial pressure rise based on the combustion has already taken place before top dead center is attained. In that case, the compression pressure would have to be determined by a separate process and stored in memory.

The pressure values obtained by the process for determining the compression pressure of an internal combustion engine can also be used to monitor an internal combustion engine.

In known processes for monitoring an internal combustion engine, for instance to monitor cyclical combustion fluctuations and misfires in an internal combustion engine, the indicated mean pressure is determined. This is very costly, particularly in processes in which engine monitoring is done in real time.

In another known process for monitoring an internal combustion engine, the pressure maximum is determined. Particularly in the load engine load range, no further conclusion about the cyclical combustion fluctuations can be made, because as explained above, in this operating range the compression process dominates, and by comparison, pressure increases due to the chemical reaction processes in the combustion chamber are still slight. This also makes it difficult to determine combustion misfires. To enable distinguishing misfires from combustion, high absolute accuracy of the pressure sensors is needed, but simple pickups are not that accurate.

If the above-described process for determining the combustion pressure is used to monitor an internal combustion engine, the advantage is obtained that pressure sensors having relatively low accuracy can be used to determine combustion misfires, because all that has to be evaluated is the algebraic sign (+ or −), but not the absolute level of the pressure.

If the values obtained by the described process for determining the combustion pressure are evaluated for monitoring an engine, for instance for determining the cyclical fluctuations in the work performed by the engine, then the cyclical fluctuations of the maximum value of the combustion chamber $P^*(\alpha)$ are determined.

However, it is also possible to integrate the combustion pressure $P^*(\alpha)$ over a crankshaft range that extends from a crankshaft angle before top dead center in the working phase to angle after this top dead center point. Once again, the cyclical fluctuations of this integral value $P^*_I$ are ascertained:

If combustion misfires are determined in engine monitoring, then the algebraic sign of the integral value $P^*_I$ or of the maximal value $P^*_{max}$ of the combustion pressure value is determined. To detect the maximal value $P^*_{max}$ of the combustion pressure value, the course of the combustion pressure is determined at least within one cycle including the working stroke, or in other words at least within a crankshaft angle range of 180°. As soon as the integral value or the maximal value of the combustion pressure assumes a negative value, it can be concluded from that a combustion misfire is present.

A conclusion as to the combustion pressure can be drawn particularly simply from a combustion pressure integral value $P^*_I$, with the aid of two integration operations. The integration ranges extend over a predetermined crankshaft range, for instance 60°. For the first integration, the beginning is made at a predetermined crankshaft angle, for instance top dead center $\alpha_O$ of the working cycle, and in the second integral, integration is performed up to that angle. In this way, an integral value $P^*_I$ is obtained by the following equation (6):

$$P^*_I = \int_{\alpha_0}^{\alpha_0 + \alpha_1} p(\alpha)d\alpha - \int_{\alpha_0 - \alpha_1}^{\alpha_0} p(\alpha)d\alpha \quad (6)$$

This simplification is possible because the differential pressure course can be expressed by the difference in two areas, and by substitution a reflection of the pressure course at top dead center of the working cycle is possible.

Figure 7:
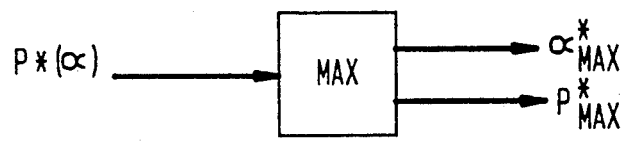
Figure 8:
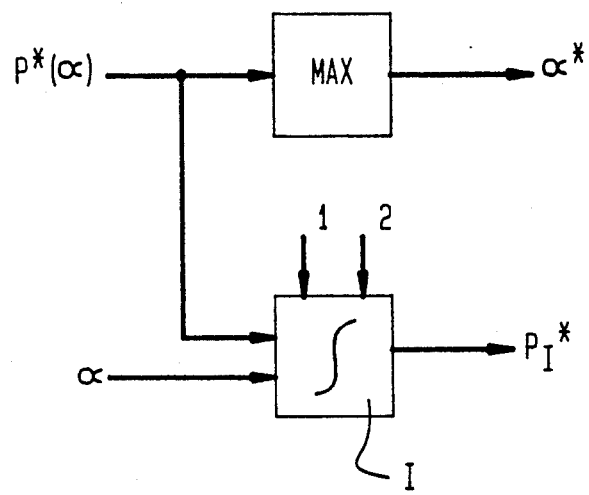
Figure 9:
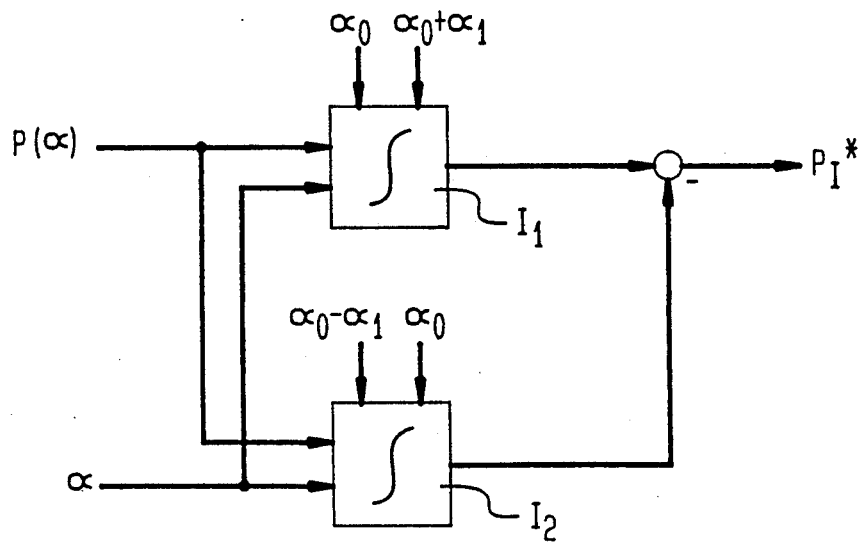

FIGS. 7-9 serve to illustrate the process for monitoring an internal combustion engine.

FIG. 7 again shows in simplified form how the maximal value $P^*_{max}$ and the associated crankshaft angle $\alpha^*_{max}$ are obtained from the combustion pressure course $P^*(\alpha)$.

The flow chart shown in FIG. 8 illustrates a process for monitoring an internal combustion engine, in which the cyclical fluctuations in the work performed by the engine are ascertained from the cyclical fluctuations of the integral value $P^*_I(\alpha)$, or of the maximal value $P^*_{max}$ of the combustion pressure course. The cyclical fluctuations of the two pressure values can be detected for instance by means of the standard deviation, the variant coefficient, or in general by the fluctuation amplitude. The cyclical fluctuations of the work performed can then be used for engine monitoring or for regulating engine smoothness.

To this end, the angle $a^*_{max}$ at which the course of the combustion pressure assumes a maximum within one cycle including the working stroke, that is, within a crankshaft angle range of 180°, is first ascertained from the combustion pressure value $P^*(\alpha)$. Two crankshaft angles $\alpha_1$ and $\alpha_2$ defining an integration range are fed to an integrator I, in addition to the current crankshaft angle $\alpha$ and the substitute pressure value $P^*(\alpha)$. The integral value $P^*_I$ is calculated by means of this integration. In this integration, the integral value shown in equation (7) is obtained:

$$P^*_I = \int_{\alpha_1}^{\alpha_2} p^*(\alpha)d\alpha. \quad (7)$$

By definition, the initial value $\alpha_1$ of the crankshaft angle is less than or equal to top dead center during the working cycle. For the second angle $\alpha_2$, an angle above top dead center during the working phase is selected, for instance an angle of 60°.

From the flow chart shown in FIG. 9, it can again be seen that the integral value of the combustion pressure course $P^*_I$ can be determined directly from the combustion chamber pressure $p(\alpha)$, without having to make an intermediate calculation of the combustion pressure course $P^*(\alpha)$.

With the aid of the flow chart in FIG. 9, equation (6) can accordingly be achieved. To this end, the combustion chamber pressure $p(\alpha)$ and the crankshaft angles $\alpha_0$ and $\alpha_0 + \alpha_1$ are fed to a first integrator $I_1$. The current crankshaft angle $\alpha$ is also fed in.

To a second integrator $I_2$, not only the combustion chamber pressure $p(\alpha)$ and the current crankshaft angle $\alpha$ but also two angular values are fed, namely $\alpha_0 - \alpha_1$ and $\alpha_0$. The product of the second integrator is subtracted from that of the first, resulting in the value $P^*_I$, as shown in equation (6).

The integral value obtained in this way can be used for controlling and monitoring an internal combustion engine, as described above. Because it is possible to recognize cyclical fluctuations in the engine work produced and to recognize misfiring, a process is also furnished here that provides protection for catalytic converters disposed in the engine exhaust gas flow.

Based on the calculated values of the combustion pressure, engine diagnosis is possible; in particular, torque components of the individual cylinders can be detected. In this process the maximal values $P^*_{max}$ of the combustion pressure $P^*(\alpha)$, or the integral value $P^*_I$, can be used as substitute variables for the torque components. Correspondingly, the differences in the cyclical fluctuations of the torque components of the various cylinders can be determined. From the different torque components or the various cyclical fluctuations of the torque components of the various cylinders, a cylinder-specific regulation can be derives, which influences the ignition, mixture preparation, injection quantity and injection onset, for instance, in Diesel engines in such a way as to produce equal torque components or identical cyclical fluctuations of the various cylinders. With the uniformity of the cylinders achieved in this way, particularly smooth, uniform engine operation can be attained and engine smoothness regulation can be achieved.

We claim:

1. A process for determining the combustion pressure of an internal combustion engine, characterized by the following steps:

the combustion chamber pressure ($p(\alpha)$) arising during normal engine operation as a function of the crankshaft angle ($\alpha$) and the compression pressure ($P_k(\alpha)$) arising during purely compression operation in the combustion chamber are detected;

for determining the combustion pressure course ($P^*(\alpha)$) as a function of the crankshaft angle ($\alpha$), the difference between the combustion chamber pressure ($p(\alpha)$) and the compression pressure ($P_k(\alpha)$) is formed;

wherein for determining the compression pressure ($P_k(\alpha)$) and combustion chamber pressure ($p(\alpha)$) for a piston until reaching a predetermined crankshaft angle is measured as a function of the crankshaft angle ($\alpha$) and stored in memory; that the memorized curve course is reflected at an axis determined by a crankshaft angle, in that the values memorized before attainment of the predetermined crankshaft are called up symmetrically with respect to the axis; and that as the predetermined crankshaft angle, the top dead center of a piston is selected.

2. A process for monitoring and regulating an internal combustion engine, with evaluation of the combustion pressure obtained by a process as defined by claim 1, characterized by the following steps:

the combustion chamber pressure ($p(\alpha)$) arising during normal operation of the engine is detected as a function of the crankshaft angle ($\alpha$);

next, a combustion pressure integral value ($P^*_I$) is determined, in that the combustion chamber pressure is integrated over two crankshaft angle ranges and the difference between these integral values is formed, wherein the crankshaft angle ranges are located symmetrically with respect to a predeterminable crankshaft angle ($\alpha_0$).

3. The process as defined by claim 2, characterized in that the top dead center of a cylinder (TDC) during one working cycle is selected as the predeterminable crankshaft angle ($\alpha_0$).

4. The process as defined by claim 3, characterized in that the crankshaft angle range extends from a first angle ($\alpha_1$) before a predetermined crankshaft angle, preferably top dead center, during the working phase to a second angle ($\alpha_2$) after the predetermined crankshaft angle.

5. The process as defined by claim 2, characterized in that the combustion pressure integral value ($P^*_I$) is used for detecting combustion misfires and controlling the smoothness or engine operation in evaluation of the cyclical fluctuations of the integral value.

6. The process as defined by claim 5, characterized in that to achieve regulation of engine smoothness, the combustion pressure integral values ($P^*_I$) of the various cylinders of the engine are adapted to one another by means of a cylinder specific regulation.

7. The process as defined by claim 6, characterized in that to achieve a regulation of engine smoothness, the cyclical fluctuations of the maximal value of the combustion pressure ($P^*_{max}$) or of the integral value ($P^*_I$) are adapted to one another with the aid of a cylinder-specific regulation.

8. The process so defined by claim 2, characterized in that for determining combustion misfiring, the algebraic sign of the combustion pressure integral value ($P^*_I$) is determined, and negative values indicate a combustion misfire.

9. The process as defined by claim 8, characterized in that for determining combustion misfiring, the algebraic sign of the integral value ($P^*_I$) is determined, with negative values indicating a combustion misfire.

10. A process for monitoring and regulating an internal combustion engine, with evaluation of the combustion pressure obtained by the process according to claim 1, characterized in that the maximal value ($P^*_{max}$) of the combustion pressure and the crankshaft angle ($\alpha^*_{max}$) existing at this value are determined, and these values serve the purpose of regulating smoothness of engine operation via the detection of cyclical fluctuations of the values, ascertaining combustion misfires, performing cylinder-specific regulation, or regulating the ignition angle.

11. The process as defined by claim 10, characterized in that for determining combustion misfires, only the algebraic sign (+ or −) of the maximal value of the combustion pressure ($P^*_{max}$) is determined, with negative values indicating a combustion misfire.

12. A process for monitoring and regulating an internal combustion engine, with evaluation of the combustion pressure obtained by a process as defined by claim 1, characterized by the following steps:

the maximal value of the combustion pressure ($P^*(\alpha)$) occurring within one cycle is determined, and the maximal values of the various cylinders of the engine are adapted to one another by means of a cylinder-specific regulation.

13. A process for monitoring and regulating an internal combustion engine, with evaluation of the combustion pressure obtained by a process as defined by claim 1, characterized by the following steps:

an integral value ($P^*_I$) is determined by integration of the combustion pressure ($P^*(\alpha)$) over a crankshaft angle range, and to achieve a regulation of engine smoothness, the integral values of the various cylinders of the engine are adapted to one another by means of a cylinder-specific regulation.

14. A process for monitoring and regulating an internal combustion engine, with evaluation of the combustion pressure obtained by a process as defined by claim 1, characterized by the evaluation of the difference between the combustion chamber pressure ($P^*(\alpha)$) and the compression pressure ($P_k(\alpha)$).

15. A process for determining the combustion pressure of an internal combustion engine, characterized by the following steps:

the combustion chamber pressure ($p(\alpha)$) arising during normal operation of the engine is detected as a function of the crankshaft angle ($\alpha$):

next, a combustion pressure integral value ($P^*_I$) is determined, in that the combustion chamber pressure is integrated over two crankshaft angle ranges and the difference between these integral values is formed, wherein the crankshaft angle ranges are located symmetrically with respect to a predeterminable crankshaft angle ($\alpha_0$).

16. The process as defined by claim 15, characterized in that the top dead center of a cylinder (TDC) during one working cycle is selected as the predeterminable crankshaft angle ($\alpha_0$).

17. The use of the combustion pressure integral value, obtained by a process as defined by claim 15, for monitoring and regulating an internal combustion engine.

* * * * *